United States Patent [19]
McGaffigan et al.

[11] Patent Number: 5,163,856
[45] Date of Patent: Nov. 17, 1992

[54] MULTIPIN CONNECTOR

[75] Inventors: Thomas H. McGaffigan, Half Moon Bay; Philip T. O'Brien, Belmont, both of Calif.

[73] Assignees: Metcal, Inc., Menlo Park, Calif.; AMP Incorporated, Middletown, Pa.

[21] Appl. No.: 774,864

[22] Filed: Oct. 11, 1991

Related U.S. Application Data

[63] Continuation of Ser. No. 424,617, Oct. 20, 1989, Pat. No. 5,098,319.

[51] Int. Cl.$^5$ .............................................. H01R 4/02
[52] U.S. Cl. ................... 439/874; 219/85.11; 219/85.22; 439/887
[58] Field of Search ................ 439/879, 886, 887; 219/89.22, 85.11; 226/56.3, 216

[56] References Cited

U.S. PATENT DOCUMENTS

| | | |
|---|---|---|
| 3,243,211 | 7/1962 | Wetmore . |
| 3,260,907 | 7/1966 | Weller et al. . |
| 3,305,625 | 2/1967 | Ellis . |
| 3,316,343 | 4/1967 | Sherlock . |
| 3,324,230 | 6/1967 | Sherlock . |
| 3,382,121 | 5/1968 | Sherlock . |
| 3,396,460 | 8/1968 | Wetmore . |
| 3,451,609 | 6/1969 | Gillett . |
| 3,525,799 | 8/1970 | Ellis . |
| 3,719,917 | 3/1973 | Fischer et al. . |
| 3,721,749 | 3/1973 | Clabburn . |
| 3,743,748 | 7/1973 | Reeder . |
| 3,906,623 | 9/1975 | Clabburn et al. . |
| 3,925,596 | 12/1975 | Siden . |
| 3,945,114 | 3/1976 | Siden et al. . |
| 3,950,604 | 4/1976 | Penneck . |
| 3,986,762 | 10/1976 | Reeder . |
| 4,022,519 | 5/1977 | Hill . |
| 4,077,692 | 3/1978 | Ellis et al. . |
| 4,206,786 | 6/1980 | Wetmore . |
| 4,252,692 | 2/1981 | Taylor et al. . |
| 4,256,945 | 3/1981 | Carter et al. . |
| 4,271,330 | 6/1981 | Watine et al. . |
| 4,341,921 | 7/1982 | Simpson . |
| 4,436,565 | 3/1984 | Weitzel et al. . |
| 4,626,767 | 12/1986 | Clappier et al. . |
| 4,701,587 | 10/1987 | Carter et al. . |
| 4,752,864 | 6/1988 | Clappier . |
| 4,769,519 | 9/1988 | Hall . |
| 4,789,767 | 12/1988 | Doljack . |
| 4,795,886 | 1/1989 | Carter, Jr. . |
| 4,914,267 | 4/1990 | Derbyshire .................... 439/874 X |

FOREIGN PATENT DOCUMENTS 0016375  5/1978  Japan .

Primary Examiner—Eugene F. Desmond
Attorney, Agent, or Firm—Howard L. Rose

[57] ABSTRACT

A relatively flat, rectangular multipin connector has a terminal end to each pin adapted to receive the stripped end of a wire to be soldered thereto. Both surfaces of the pin may be arcuate in cross-section, one surface being concave and adapted to receive a wire to be soldered thereto. The convex surface has a covering of a thin layer of ferromagnetic material having an effective Curie temperature above the fusion temperature of the solder to be employed. A sleeve of heat shrinkable material has an interior ring of solder and is positioned over the region of contact between the wire and terminal end of the pin and has fusible plastic at each end. Each wire is placed on an individual pin and successively clamped in place, each between a different pair of jaws. The sleeve is slid over the terminal and the assembly is subjected to an alternating magnetic field to heat the ferromagnetic material, melt the solder, shrink the sleeve to force all of the solder into the region of contact between the pin and wire and cause the sealant at the ends of the tube to seal the tube to the wire insulation and the connector. A non-wettable material placed over the ferromagnetic material prevents magnetic shielding of the ferromagnetic material. The concave surface of the pin has a curvature that insures that all the solder is squeezed by the sleeve into the region of contact of the pin and the wire.

6 Claims, 3 Drawing Sheets

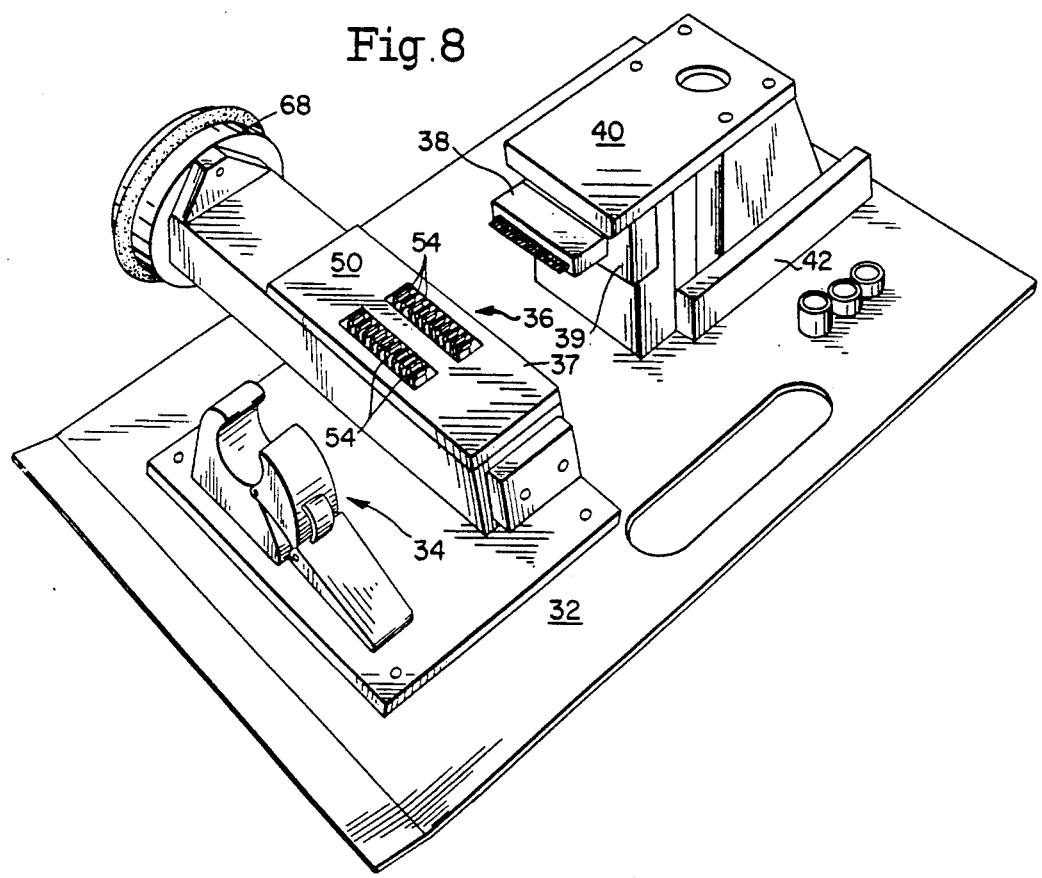
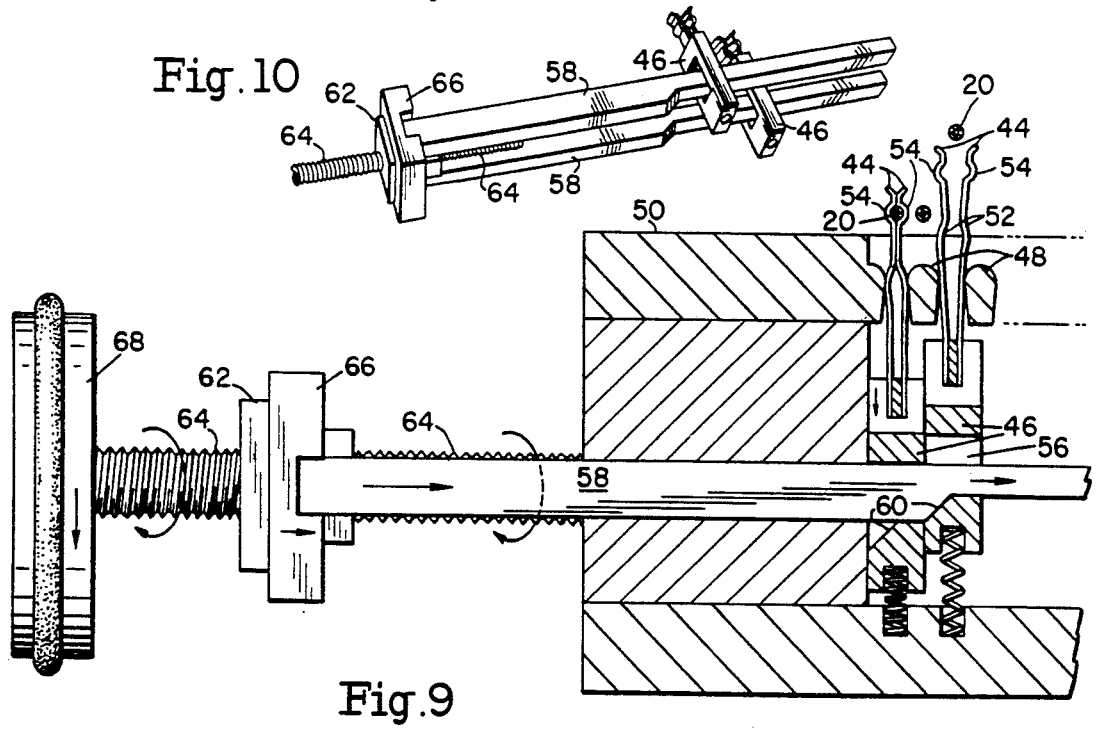

MULTIPIN CONNECTOR

This is a continuation of application Ser. No. 07/424,617, filed Oct. 20, 1989, now U.S. Pat. No. 5,098,319.

BACKGROUND OF THE INVENTION

The present invention relates to multipin connectors and more particularly to multipin connectors having soldered connections of wires to individual pin terminals of the connectors enveloped within a heat shrinkable sleeve wherein the heat is developed internally of the sleeve and to the method of making the same.

Flat rectangular, multipin connectors are in extensive use today particularly in the military. In the latter environment it is essential that each termination be sealed against the ambient atmosphere and presently this is accomplished by enclosing each termination (connection of wire to pin terminal) within a sealed tube. Specifically a wire to be connected to a pin termination has its end stripped and a heat shrinkable plastic tube slid over the insulation adjacent the stripped end of the wire. The sleeve has a ring of solder centrally located internally thereof and rings of sealant at each end of the sleeve. The wire is placed on the pin terminal and the sleeve is slid over the insulation of the wire and the other end over the pin beyond the region of overlap of pin and wire.

All wires and sleeves are so positioned and then hot air guns, or equivalent (ovens) are used to heat the structure; see FIG. 7 of U.S. Pat. No. 3,945,114. In U.S. Pat. No. 3,721,749, it is suggested that induction heating can be used but there is no description or discussion of the apparatus or structures required for such operation. Regardless of the heat source used in the operation, the solder melts, the sleeve shrinks and the solder is bought into contact with the region of contact between the wire and pin and the end rings of sealant bond to the adjacent surfaces, providing a sealed connection.

There is a fundamental problem with such a structure and procedure. The heat must be applied through a plastic, the sleeve. The sleeve is a poor conductor of heat and thus the temperature of the hot air external to the sleeve must be much greater than the actual temperature required to melt and flow the solder. This is due to the large temperature drop across the wall of the plastic sleeve. Also, the time to produce satisfactory joints is unnecessarily long. Further, when connectors are employed in situations where the wires sizes or lengths vary greatly, and the heat required must be varied in order to accommodate the largest and/or longer wire size, the terminations of smaller and/or shorter wires are subjected to excessive heat and may be damaged. Also during this process the solder may be made overheated and thus degraded, or underheated and thus producing a cold solder joint, and/or the sealant may not be properly heated and thus does not environmentally seal.

BRIEF DESCRIPTION OF THE INVENTION

In accordance with the present invention, the problems stated above are overcome by heating each pin terminal individually and directly. Heat is generated at the terminal, internal to the heat shrinkable sleeve surrounding the terminal. The solder and the sealant are positioned internally to the sleeve and as indicated below each terminal is heated only to the extent necessary to solder each wire to its associated pin.

Specifically, the surface of the pin to which a wire is to be soldered is preferably concave and is tinned. The opposite surface preferably has a convex surface on which is plated, laminated or coated to a depth of 1 to 2 skin depths at the excitation frequency employed, by a material having a high mu with an effective Curie temperature somewhat (perhaps by as much as 20° to 40° C.) above the melting point of the solder and heat shrink sleeve employed. A Curie temperature of 320° C. is sufficient for solders usually employed in such applications. Various high mu materials may be employed, such as, Alloy 42. The concept of using copper or like non-magnetic, low resistivity material as a coating on the high magnetic permeability material is disclosed in U.S. Pat. No. 4,256,945 the subject matter of which is incorporated herein by reference.

A ring of solder is disposed internally and centrally of the sleeve and extends in a circle around a region of contact between pin and wire. This arrangement poses two problems. First, if the molten solder contacts the ferromagnetic material, and wets it, this can prevent the generation of sufficient energy and thus prevent the ferromagnetic material from achieving its effective Curie temperature resulting in a cold solder joint. To overcome this problem, the high mu material is coated with a very thin layer of non-wettable material.

A second problem is to insure that substantially all of the solder is squeezed out of the region adjacent the high mu material and deposited in the concave region of the pin terminal where it contacts both the wire and the pin, insuring a quality solder joint. The reason for this is that if the solder is allowed to remain adjacent to the ferro-magnetic material it acts as a magnetic shield blocking the magnetic flux from the heater material. The convex surface is configured to force the solder away from this surface to achieve this result. In addition, a hole or holes may extend through the three layers so that solder may flow directly from adjacent the non-wettable surface to the concave surface in the region of the wire. The shrinking plastic tube essentially pumps the solder to the wire and adjacent concave region.

The ferromagnetic materials on all pins are heated simultaneously by an induction coil energized preferably by a high frequency, constant current power supply; the amount of energy delivered to each pin being independent of the others and is only a function of the thermal load and Curie temperature at each pin location. Thus the energy delivered to a termination of a large diameter wire will be significantly greater than to the termination of a small diameter wire but the temperature of all terminations will be the effective Curie temperature of the ferromagnetic material, this being the controlling parameter, and overheating does not and cannot occur.

In additional to the above advantages, the delivery of heat is far more efficient resulting in faster process completion, 30 seconds with the process of the present invention as opposed to 4 to 20 minutes in the prior art system depending upon the skill of the operator. The increase in speed is a direct result of the increase in efficiency. In the prior art the heat must be delivered through the heat shrinkable tube, a poor conductor of heat, to the solder, wire, pin and sealant. In the present invention, the heat is generated directly by the pin. The solder is in contact with the sleeve transferring heat directly thereto, and thus a very efficient system is established that uses far less energy than the prior devices.

The heating sequence is: (1) connecting the coil to a source of energy as a result of which (2) the ferromagnetic material heats up, the sleeve starts shrinking, the contact reaches Curie temperature; (3) solder heats, flux flows, solder melts and flows, wets the contact and wire, the soldering is complete; (4) meltable inserts melt and seal; (5) sleeve now fully shrunk; operation is completed.

It is thus an object of the present invention to simultaneously and individually inductively heat one or a plurality of pin terminals to solder wire(s) to the pins whereby there is delivered to each termination only that quantity of heat necessary to solder the wire to its terminal while simultaneously delivering heat to the solder and to a heat shrink sleeve and sealing materials via the pin terminal to affect a well-soldered and sealed termination.

In practicing the present invention, each wire to be connected to the pins has one end stripped and one of the aforesaid sleeves is slid over the wire adjacent the stripped end. The bare wire is laid on the concave surface of the pins adjacent the connector and extends outwardly therefrom through a first pair of jaws. A mechanism is provided with one or a number of pairs of jaws at least equal to and in alignment with a different one of the pins. Upon the first wire being positioned as above, an actuator is operated to close the first pair of jaws to hold the wires and the sleeve is slid over the pin and wire junction. A second wire is placed on a second pin terminal, the wire clamped and a sleeve slid in place and so on until all sleeves and wires are in place and the latter clamped. A single structure having many sleeves may also be employed as in U.S. Pat. No. 3,721,749.

An induction coil is then positioned over all junctions and activated by high frequency power supply, preferably a constant current power supply in the megacycle range, heating each pin until each joint is soldered, each sleeve shrunk and the sealants activated to complete the operation. The result is rapidly completed and provides uniformly joined and sealed junctions wherein the sleeve and none of the junctions are subjected to excessive heating, that is, substantially no heating above the effective Curie temperature of the ferromagnetic material or the maximum operating temperature of the materials employed.

Thus another object of the present invention is to provide a method of assembly of wires to multipin connector that is both rapid and safe to the components involved.

As stated more fully hereinafter, the ferromagnetic materials employed at different pins may have different Curie temperatures and thus may utilize solders of different melting temperatures and also offer different regulation temperatures and powers.

BRIEF DESCRIPTION OF THE FIGURES

FIG. 8 is a perspective view of a structure for assembling wires to the connector of FIG. 1;

FIG. 9 is a view partially in section of the jaw operating mechanism of the present invention; and FIG. 10 illustrates in perspective the drive for the wedge structure mechanism.

DETAILED DESCRIPTION OF THE INVENTION

Figure 1:
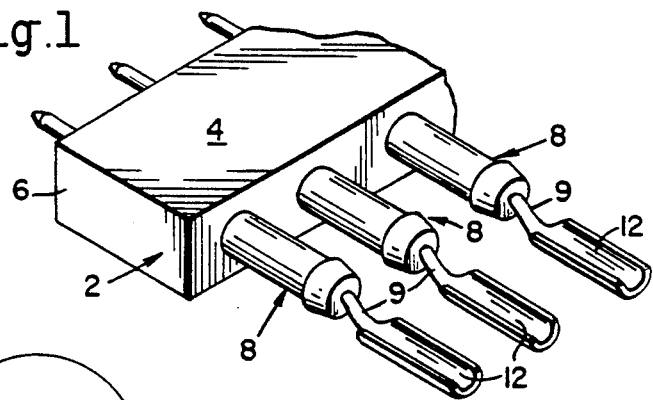
FIG. 1 is a perspective view of a connector to which the present invention may be applied.

Referring to FIG. 1 of the accompanying drawings, there is illustrated, in perspective, a flat multipin connector 2 according to the present invention. The connector 2 has a plurality of pins, male or female but illustrated as male, extending through a block of insulating material 4 from a front face 6 thereof out through the back of the connector providing exposed pin terminals 8.

Figure 2:
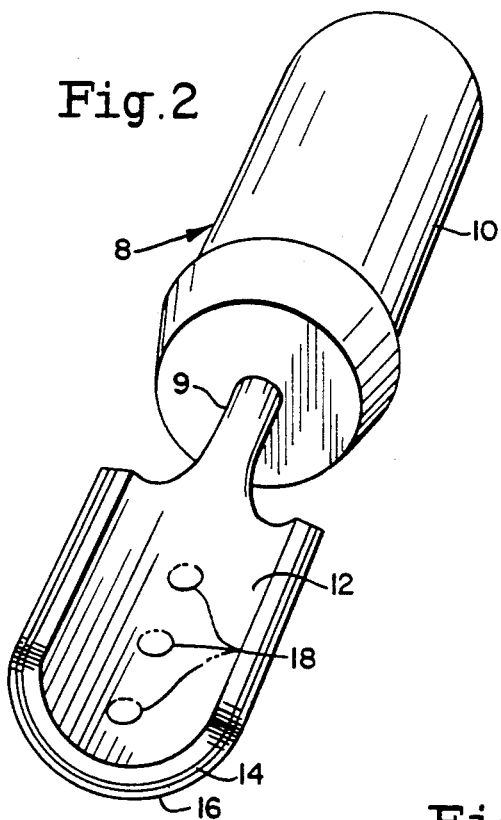
FIG. 2 is a detailed perspective view of one of the pins of FIG. 1 with a layer of ferromagnetic material and a layer of non-wettable material applied thereto.

The terminals 8 are adapted to have wires connected thereto and reference is now made to FIG. 2 of the accompanying drawings. The pins 8 have a downwardly depending region 9 (as illustrated in FIGS. 1 and 2) of conductive material, for instance, copper, extending outwardly from a projection 10 of the body 4 and terminating in a region 12 curvilinear (preferably arcuate) in cross-section. The arcuate region 12 is adapted to receive a wire to be soldered thereto. Other than the general configuration of the region 12, the pin structure is not critical and its configuration may vary in accordance with the mating connector.

The region 12 of the pin is coated on its convex side (underside as viewed in FIG. 2) with a ferromagnetic material 14 in direct thermal contact and, if desired, direct electrical contact with the convex surface of region 12 of the pin 8. The ferromagnetic material 14 may be an alloy of nickel and iron, to provide a substance having an effective Curie temperature compatible with the solder to be employed. For conveniences all such materials are referred to as ferromagnetic materials. As stated above the materials employed at different pins may have different Curie temperature and thus may require solders of different melting temperatures. In order to prevent the ferromagnetic layer 14 from being wetted by solder, the layer 14 is coated with a solder non-wettable material 16 such as polytetrafluoroethylene or a polyamide. Another method is to form an oxide coating from the ferromagnetic material itself. The purpose of such a coating as indicated above, is to prevent wetting of the ferromagnetic material by solder which would prevent the generation of the correct amount of energy by magnetic induction and prevent the ferromagnetic material from heating to its effective Curie temperature. Specifically, if solder were allowed to wet the ferromagnetic material it would reduce the resistivity and would act as a shield to the induction field and thus reduce power. Such an occurrence would produce a cold solder joint or an even more defective solder joint. The coating material employed will not be wetted by solder and thus when contacted by it, the solder will tend to bead and be diverted (in the present invention squeezed out) from the region adjacent the convex segment of the pin. The coating must also have sufficient temperature resistance to remain intact at the material's Curie temperature.

Figure 3:
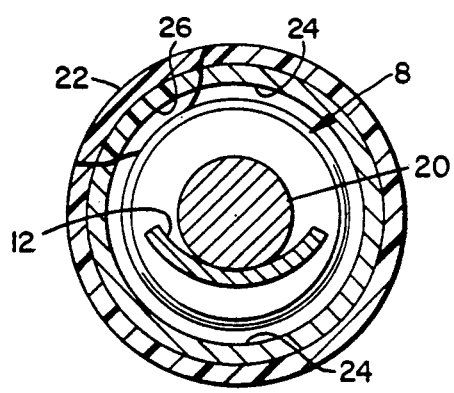
FIG. 3 is an end view of a pin of FIG. 2 with a wire lying on a concave region thereof and such region surrounded by a heat shrinkable sleeve with a solder ring and adhesive regions therein.

The member 12 of the pin 8 may have one or a plurality of holes 18 (or a slot) to facilitate movement of solder in the region under the convex segment of pin 8 to the upper concave surface to contact a wire as is described relative to FIG. 3.

Figure 4:
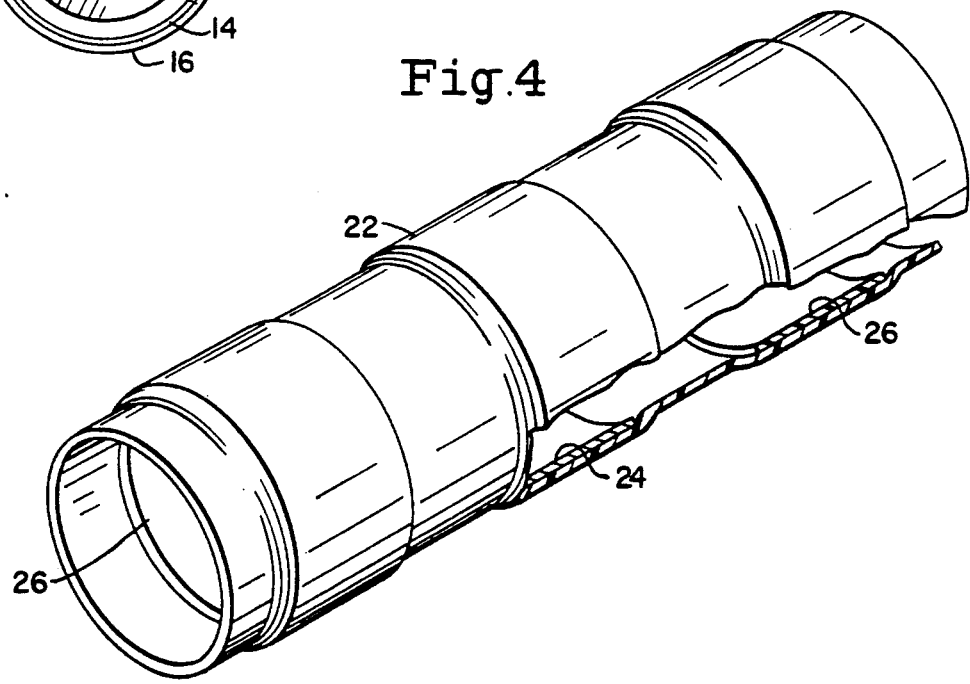
FIG. 4 is a perspective view of a solder sleeve employed.

Referring specifically to FIGS. 3 and 4 of the accompanying drawings there is illustrated in FIG. 3 an end view of a pin 8 with a wire 20 in place and a heat shrinkable sleeve 22 disposed about the whole assemblage while in FIG. 4 there is illustrated in perspective the heat shrinkable sleeve 22; the latter as if all elements are transparent. The sleeve 22 is an elongated member to be placed over the region where wire 20 overlies region 12 of the pin 8 with a ring of solder 24 located internally of the sleeve and disposed relatively centrally of the region of overlap of wire 20 and pin 8. Each end of the sleeve 22 has an interior ring 26 of heat activated sealant, such as a co-polymer of polydimethylsiloxane and a polycarbonate, a co-polymer of polydimethylsiloxane and a polyamide or the like.

Figure 5:
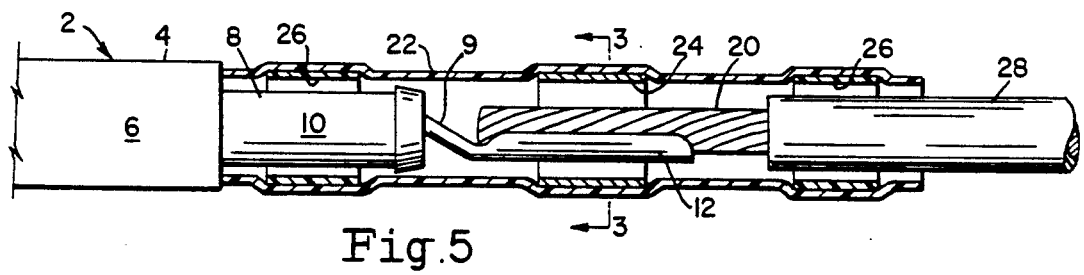
FIG. 5 is a side view of the pin and wire enclosed within a solder sleeve before heating.
Figure 6:
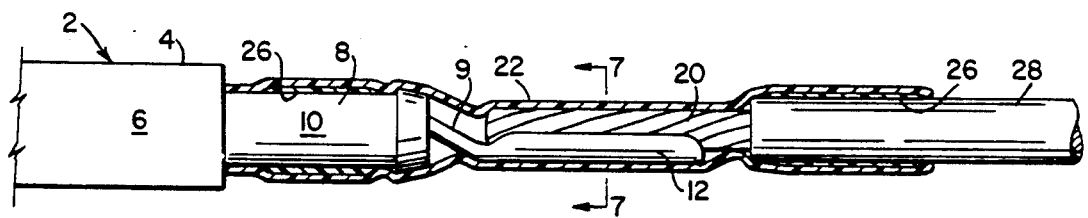
FIG. 6 is a side view of the structure of FIG. 5 after heating and the connection has been completed.
Figure 7:
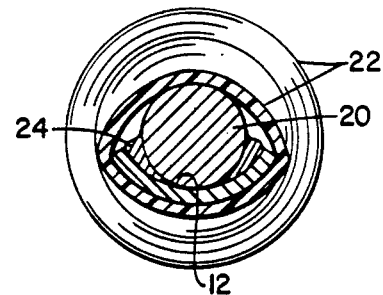
FIG. 7 is an end view of the pin and wire junction after completion of a junction.

Upon subjecting the assembly to a magnetic induction field the ferromagnetic material is heated, melting the solder and causing the heat shrink sleeve to shrink down around the pin and wire as illustrated in FIG. 5. Continued heating brings all of the junctions up to fusion temperature, each sleeve shrinks about the entire region and adjacent areas. As previously indicated, the solder located adjacent the concave surface is squeezed between the heat shrinkable sleeve and the non-wettable coating covering the ferromagnetic material and is moved to the concave region where it bridges the wire and contact and when cool, completes the soldering operation. The shrinkage of the sleeve brings the heat activated sealants into contact with their adjacent areas whereby sealing the ends of the sleeve to the wire insulation at one end and the cylindrical region 10 of the connector 4, FIG. 1. FIG. 7 illustrates the relationship of the wire, the segment 12 and the solder 24 after the heating operation is completed.

Almost simultaneously all of the solder joints are completed, sleeves shrunk and sealants activated, at which point the structure autoregulates at some temperature along its autoregulation curve, region D of the graph. As can be seen in FIG. 3 of U.S. Pat. No. 4,256,945, the load, variously indicated by load lines 19 and 21, determines the final temperature of regulation. By choosing a temperature about 20° C. above the Curie temperature of the ferromagnetic material, the temperature at regulation insures that the energy requirements of all loads are met.

In order to insure that all of the solder is diverted to the concave side of the region 12 of the pin, the curvature of the concave surface thereof must be such that the maximum force is applied to the center of the convex region. In consequence the solder is forced out of that region first and as the sleeve tightens is forced up the sides of the convex surface and spills over into the concave region. To further insure that very little if any solder remains on the underside of the region, holes 18 or a slot through the structure may be employed to provide an addition escape route for the solder. A shrinkable sleeve with a localized solder preform as described in U.S. Pat. No. 4,341,921, may also be used in the instant invention to further assure that the location of the solder preform does not inhibit the termination process.

As brought out in U.S. Pat. No. 4,256,945, the effect of the ferromagnetic material on a copper or other relatively conductive substrate greatly enhances the temperature material characteristics of Curie temperature material. The sections of that patent dealing with such regulation are incorporated herein by reference. Other materials and combinations of materials to affect Curie temperature regulation are disclosed for instance in U.S. Pat. No. 4,701,587, and may be employed herein where practical. The teaching of this reference is incorporated herein by reference. The magnetic induction field is generated from a constant current supply which may be of the type disclosed in U.S. Pat. No. 4,626,767. The power supply of U.S. Pat. No. 4,271,330 may also be used in the instant invention with the same results. The term constant current is a current that satisfies the equation $$\frac{\Delta |I|}{I} < -\tfrac{1}{2}\frac{\Delta |R|}{R}$$

where I and R are current through and resistance of the heater respectively. The temperature regulation is good when the current is not variable. The current can vary so long as the above equation is observed. It is to be noted however that as the value of the left side of the equation approaches the value of the right side, regulation becomes poor. Alternative power supplies that may be employed are found in U.S. Pat. Nos. 4,752,864, 4,769,519 and 4,795,886. A frequency of 13.56 MHz was employed although frequencies as low as 100 KHz and as high as 50 MHz are useful. The magnetic material had a skin depth of approximately 1.8.

The term "Curie temperature" or "effective Curie temperature" as used herein refers to a temperature at which the permeability of the ferromagnetic material is reduced to such an extent that it has little effect upon the system, say mu of 2 or 3. This temperature may be only a few degrees or perhaps 100 degrees less than the absolute Curie temperature wherein the permeability is about one depending upon the ferromagnetic material employed.

It should be noted that not all pins necessarily have the same Curie temperature. If, for instance, the wire insulation or other components have different temperatures at which degradation may occur, then different Curie temperatures may be necessary. Such is easily accomplished since the ferromagnetic material applied to the pins is determinative of the temperature at that pin and all that is required is careful planning.

A general view of an apparatus employed in attaching the wires to the pins is illustrated in FIG. 8 of the present invention. A platform 32 supports a releasable cable clamp 34 disposed a short distance from a plurality of pairs of jaws 36 (fingers) located in a jaw housing 37 positioned between the cable clamp 34 and a holding fixture 39 for a multipin connector 38. An induction coil, not illustrated, is secured to a ceramic or other non-conductive or paramagnetic head 40 mounted on a trolley and track assembly 42.

The interior of the finger assembly is illustrated in FIG. 10 of the accompanying drawings. The fingers are staggered in two rows, one row on the cable clamp side of the structure and the other on the connector side. The following initial description relates to the jaw and actuation assembly on the cable clamp side of the apparatus. Each jaw consists of a pair of spring fingers 44 anchored in a slide block 46 supported for vertical movement as illustrated in FIG. 8. Each pair of fingers is supported between a pair of ribs 48 extending parallel to the depth of the fingers and formed in a top plate 50 or between the side plates of the assembly located above the slide blocks.

The spring fingers of a pair are mirror images of one another and each has an outward curve so that when in the open position the outwardly curved regions 52 of the fingers are disposed vertically over the ribs 48. The upper ends of the fingers 48 have small, opposed generally semi-circular regions 54 for receiving a wire with its insulation intact.

The lower regions of the slide blocks have apertures 56 therethrough to receive a push rod 58. The forward or right side of the rod, as viewed in FIG. 8, has a smaller vertical height than the left half, the two halves having a common straight top surface with a sloping intersection 60 along the lower surface of the rod. The lower surface of the apertures 56 in the slide blocks 46 have sloping surfaces of the same inclination as the surface 60 of the slide bar 58.

Referring now to both sets of jaws, the row of jaws closer to the multipin connector are staggered relative to the other sets of jaws so that a wire to be soldered in a left most pin is clamped, as is to be described, in the left most jaw of one row and the wire to be soldered to the adjacent pin is champed in the left most jaw of the other row. Each row of jaws is activated by a different slide bar (see FIG. 10) driven by one common mechanism to now be described.

A block 62, or wall of the fixture, and reference is made to FIG. 10 of the accompanying drawings, supports a lead screw 64 on which is located a nut 66. A wheel 68 is secured to the lead screw 64 to rotate it when it is desired to activate (close or open) the jaws. It will be noted that there are two push rods secured to opposite sides of the nut 66 with the lead screw located between them.

Upon rotation of the wheel 68 in a direction to close the jaws, the push rods 58 move to the right as viewed in FIGS. 10 and 11. The sloping surface 60 of the rod engages the sloping surface of a slide block 46 forcing the block down. The outwardly bowed regions 52 of the spring fingers 44 are drawn down between the ribs 48 and deflect the tines 44 toward one another to clamp a wire disposed between the regions 54 of the tines. As each wire is positioned the wheel is rotated, the rods 58 are advanced and another pair of jaws is closed.

In practicing this method of the present invention, a multipin connector is clamped in place, each wire of a cable has its end stripped and a sleeve slide over the end. The cable is clamped in the cable clamp, either before or after the sleeves are positioned depending upon operator preference, each wire is placed between a different set of jaws with the stripped end of the wire laid on a different concave region 12 of a different pin. As each wire is placed between a pair of fingers, the wheel 68 is rotated to clamp that jaw, and the sleeve associated with the clamped wire is slid over the region of interface between wire and pin. When all of these operations are completed, the induction coil and trolley 42 are slid over top of the connector and energized by a high-frequency induction field. After typically 30 seconds, the coil is de-energized and the connector and cable are removed from the fixture.

Many variations and modifications of the above-described embodiments are within the ordinary skill of the skilled artisan in this art, without departing from the scope of the invention. Accordingly, those modifications and embodiments are intended to fall within the scope of the invention as defined by the following claims.

We claim:

1. A multipin connector comprising a plurality of electrically conductive connector members each having a first surface for receiving a wire to be soldered thereto and an opposed surface,
   ferromagnetic means in heat transfer relationship to said members,
   means for developing a unitary alternating magnetic field coupled to said ferromagnetic means for concurrently heating said ferromagnetic means to heat said plurality of members,
   said ferromagnetic means having a Curie temperature such that only that quantity of heat energy required to produce a quality solder joint is applied to each member individually.

2. An electrical connector according to claim 1 wherein said ferromagnetic means comprises a coating of ferromagnetic material on the oppose surface each said pin.

3. An electrical connector comprising
   a housing,
   at least one electrically conductive terminal having a wire receiving region,
   said terminal extending from said housing to said wire receiving region,
   said region including a first member constituting an extension of said terminal and having a concave surface for receiving a wire,
   the radius of said surface generally conforming to the radius of the circumference of a wire to be received thereon,
   said region having a second surface opposed to said first surface,
   a material having high magnetic permeability disposed on said second surface,
   said material having a Curie temperature above a preselected temperature.

4. An electrical connector according to claim 3 further comprising
   means for inducing heat in said material.

5. An electrical connector according to claim 4 wherein
   said means comprises an induction coil for inducing a magnetic field in said material.

6. An electrical connector according to claim 5 wherein
   said material has a thickness of 1 to 2 skin depths at the frequency of the magnetic field to which said material is to be subjected.

* * * * *